US012758920B2

(12) United States Patent
Ito et al.

(10) Patent No.: US 12,758,920 B2
(45) Date of Patent: Oct. 13, 2026

(54) HOLLOW FIBER MEMBRANE MODULE

(71) Applicant: NOK CORPORATION, Tokyo (JP)

(72) Inventors: Yosuke Ito, Shizuoka (JP); Matsuyoshi Yamashita, Shizuoka (JP)

(73) Assignee: NOK CORPORATION, Tokyo (JP)

(*) Notice: Subject to any disclaimer, the term of this patent is extended or adjusted under 35 U.S.C. 154(b) by 319 days.

(21) Appl. No.: 18/565,853

(22) PCT Filed: May 11, 2022

(86) PCT No.: PCT/JP2022/019905
§ 371 (c)(1),
(2) Date: Nov. 30, 2023

(87) PCT Pub. No.: WO2022/255046
PCT Pub. Date: Dec. 8, 2022

(65) Prior Publication Data

US 2024/0252989 A1 Aug. 1, 2024

(30) Foreign Application Priority Data

Jun. 2, 2021 (JP) ................................ 2021-092955

(51) Int. Cl.
*B01D 63/02* (2006.01)
*B01D 53/26* (2006.01)
*H01M 8/04119* (2016.01)

(52) U.S. Cl.
CPC ........... *B01D 63/02* (2013.01); *B01D 53/268* (2013.01); *H01M 8/04149* (2013.01);
(Continued)

(58) Field of Classification Search
CPC .. H01M 8/04; H01M 8/04149; B01D 53/268; B01D 63/02; B01D 63/021;
(Continued)

(56) References Cited

U.S. PATENT DOCUMENTS

2001/0015500 A1 8/2001 Shimanuki
2008/0237902 A1* 10/2008 Nagumo ............... B01D 53/22
261/104

(Continued)

FOREIGN PATENT DOCUMENTS

JP 2001-202978 7/2001
JP 2005-265196 9/2005

(Continued)

OTHER PUBLICATIONS

International Search Report issued in International Patent Application No. PCT/JP2022/019905, dated Jul. 19, 2022.

(Continued)

*Primary Examiner* — Robert Clemente
(74) *Attorney, Agent, or Firm* — GREENBLUM & BERNSTEIN, P.L.C.

(57) ABSTRACT

A hollow fiber membrane module includes: an inner case; an outer case that covers the inner case from an outer periphery side with a space left therebetween; and a plurality of hollow fiber membranes that are provided in the space between the inner case and the outer case. The inner case includes an introduction portion that establishes communication between inside of the inner case and outside of the inner case on an upstream side of the inner case and the outer case. The outer case includes a discharge portion that establishes communication between inside of the outer case and outside of the outer case on a downstream side. The inner case includes a bypass portion that establishes communication between the inside of the inner case and the outside of the inner case on the downstream side. The bypass portion includes at least one opening that penetrates through the inner case between the inside and the outside.

5 Claims, 6 Drawing Sheets

1

(52) U.S. Cl.
CPC ...... *B01D 2257/80* (2013.01); *B01D 2313/04* (2013.01); *B01D 2313/08* (2013.01); *B01D 2313/083* (2013.01)

(58) Field of Classification Search
CPC ............ B01D 63/0231; B01D 2313/04; B01D 2313/08; B01D 2313/083; B01D 2313/10; B01D 2313/20
See application file for complete search history.

(56) References Cited

U.S. PATENT DOCUMENTS

| | | | | |
|---|---|---|---|---|
| 2020/0036016 | A1* | 1/2020 | Horiuchi | H01M 8/04149 |
| 2024/0157301 | A1* | 5/2024 | Ito | H01M 8/04 |
| 2024/0157302 | A1* | 5/2024 | Ito | H01M 8/04149 |
| 2024/0173675 | A1* | 5/2024 | Ito | B01D 63/022 |
| 2024/0335794 | A1* | 10/2024 | Yamashita | H01M 8/04149 |

FOREIGN PATENT DOCUMENTS

| | | |
|---|---|---|
| JP | 2007-212076 | 8/2007 |
| JP | 2011-143347 | 7/2011 |

OTHER PUBLICATIONS

Written Opinion issued in International Patent Application No. PCT/JP2022/019905, dated Jul. 19, 2022.
International Preliminary Report on Patentability issued in International Patent Application No. PCT/JP2022/019905, dated Nov. 21, 2023.
Japan, Notice of Reasons for Refusal received in Japanese Patent Application No. 2023-525688, dated Oct. 2, 2024.
Extended European search report issued in EP Application No. 22815801.0, dated Apr. 17, 2025.
Canadian Office Action issued in CA application No. 3221096, dated Nov. 20, 2024.
Korea, Office Action received in KR Application No. 10-2023-7041213, dated Feb. 21, 2026, and English language translation.
China, Office Action received in CN Application No. 202280039783.7, dated Nov. 13, 2025, and English language translation thereof.
China, Office Action received in CN Application No. 202280039783.7, dated May 14, 2026, and English language translation.

* cited by examiner

HOLLOW FIBER MEMBRANE MODULE

CROSS REFERENCE TO RELATED APPLICATIONS

The present application is a national stage application of International Patent Application No. PCT/JP2022/019905 filed on May 11, 2022, which claims the benefit of Japanese Patent Application No. 2021-092955, filed on Jun. 2, 2021. The contents of these applications are incorporated herein by reference in their entirety.

BACKGROUND

Technical Field

The present disclosure relates to a hollow fiber membrane module, and particularly relates to a hollow fiber membrane module used for a dehumidification/humidification device.

Description of the Related Art

A fuel cell is provided with a humidification device for humidifying an electrolyte membrane by humidifying reaction gas used for power generation therefor. For such a humidification device of the fuel cell, a hollow fiber membrane module including hollow fiber membranes is used in the related art. Such a hollow fiber membrane module includes an inner case with a tubular shape, an outer case that covers the inner case on an outer periphery side, and a plurality of hollow fiber membranes that extend along an annular space formed between the inner case and the outer case and is adapted such that gas flows from inside of the inner case to outside of the outer case through the annular space. In such a hollow fiber membrane module, reaction gas (off gas) containing moisture after being used for power generation flows inside the hollow fiber membrane module from the inside of the inner case to the outside of the outer case through the annular space, reaction gas before utilization flows inside the hollow fiber membrane, the humid off gas and the dry reaction gas thus contact each other via the hollow fiber membrane, the moisture in the humid off gas moves to a side of the dry reaction gas due to a membrane separation effect of the hollow fiber membrane, and the reaction gas is humidified (For example, see Japanese Patent Application Publication No. 2005-265196).

SUMMARY

A flow of the humid gas inside the hollow fiber membrane module as described above is related to humidification performance of such a hollow fiber membrane module, and it is possible to cause the humidification performance of the hollow fiber membrane module to be improved by the humid gas flowing without any stagnation inside the hollow fiber membrane module. Therefore, in order to improve the humidification performance of the hollow fiber membrane module, a configuration capable of curbing a pressure loss of gas flowing inside the hollow fiber membrane module is required in the related art.

The present disclosure relates to the aforementioned problem.

A hollow fiber membrane module according to the present disclosure includes: an inner case that is a member with a tubular shape; an outer case that is a member with a tubular shape covering the inner case from an outer periphery side with a space left therebetween; and a plurality of hollow fiber membranes that are provided in the space between the inner case and the outer case, wherein the inner case includes an introduction portion that is a part establishing communication between inside of the inner case and outside of the inner case on a side of one end in an extending direction of the inner case and the outer case, the outer case includes a discharge portion that is a part establishing communication between inside of the outer case and outside of the outer case on a side of another end in the extending direction, the inner case includes a bypass portion that is a part establishing communication between the inside of the inner case and the outside of the inner case on the side of the another end in the extending direction, and the bypass portion includes at least one opening that penetrates through the inner case between the inside and the outside.

In the hollow fiber membrane module according to an aspect of the present disclosure, the inner case includes one end portion with a tubular shape that is a part on the side of the one end and another end portion with a tubular shape that is a part on the side of the another end and connects to the one end portion on the side of the another end, the introduction portion is provided at the one end portion, the bypass portion is provided at the another end portion, the one end portion has a diameter reduced as progress from the one side to the another side in the extending direction, and the another end portion extends along the extending direction.

In the hollow fiber membrane module according to an aspect of the present disclosure, the bypass portion and the discharge portion at least partially face each other in a direction perpendicularly intersecting the extending direction.

The hollow fiber membrane module according to an aspect of the present disclosure includes: an inner case sealing portion that is a member tightly closing an opening of the inner case that opens the inside of the inner case on the another side.

In the hollow fiber membrane module according to an aspect of the present disclosure, the introduction portion includes a plurality of openings that establish communication of the inner case between the inside and the outside.

The hollow fiber membrane module according to an aspect of the present disclosure includes: a one-end-side sealing portion that tightly closes an open portion that is opened on the one side of the space between the inner case and the outer case; and an other-end-side sealing portion that tightly closes an open portion that is opened on the another side of the space between the inner case and the outer case, wherein the plurality of hollow fiber membranes extend along the extending direction and penetrate through the one-end-side sealing portion and the other-end-side sealing portion.

According to the hollow fiber membrane module of the present disclosure, it is possible to curb a pressure loss of gas flowing inside the hollow fiber membrane module.

DETAILED DESCRIPTION

Hereinafter, embodiments of the present disclosure will be described with reference to the drawings.

Figure 1:
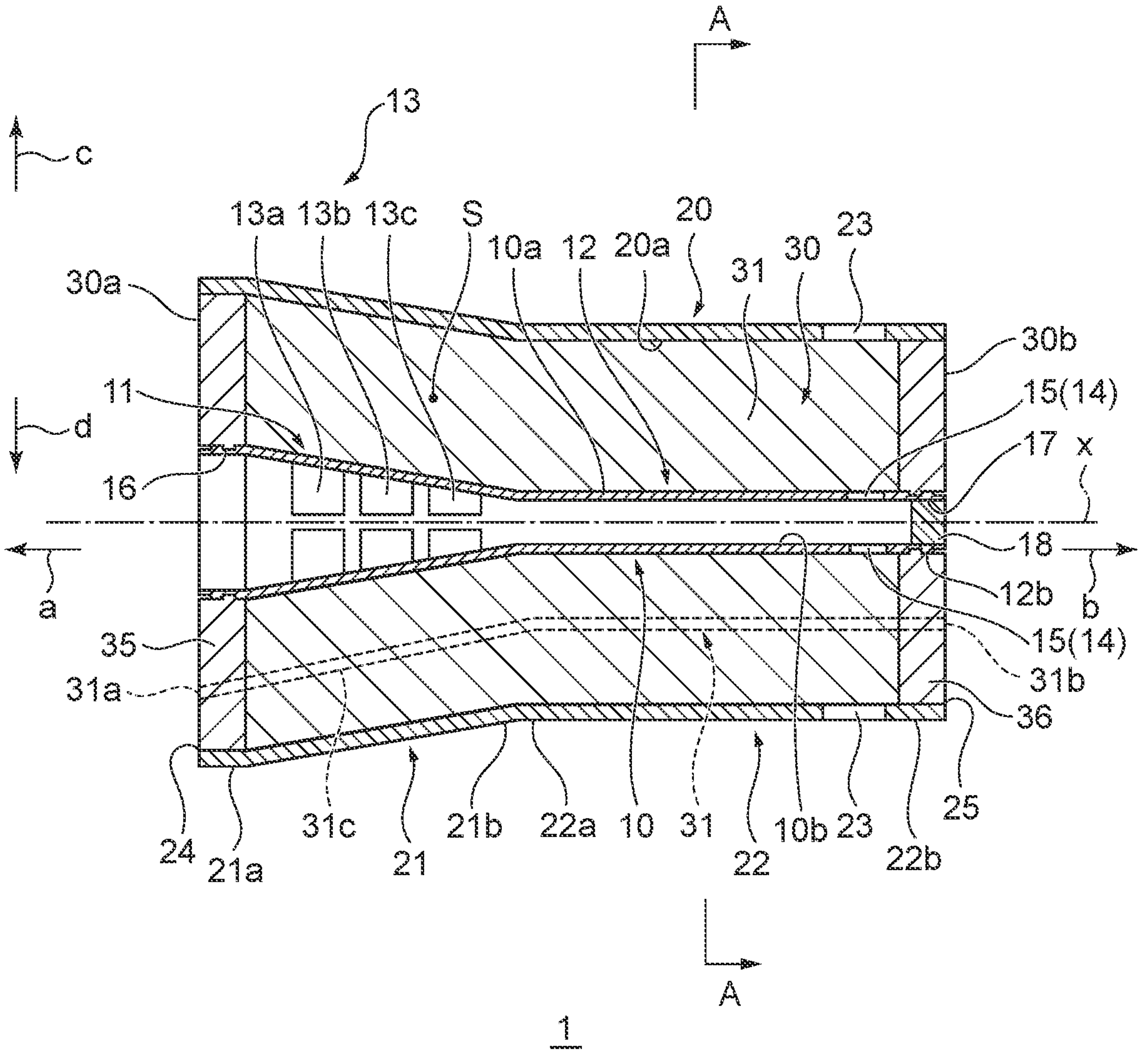
FIG. 1 A sectional view in a section along an extending direction illustrating an overview configuration of a hollow fiber membrane module according to an embodiment of the present disclosure.
Figure 2:
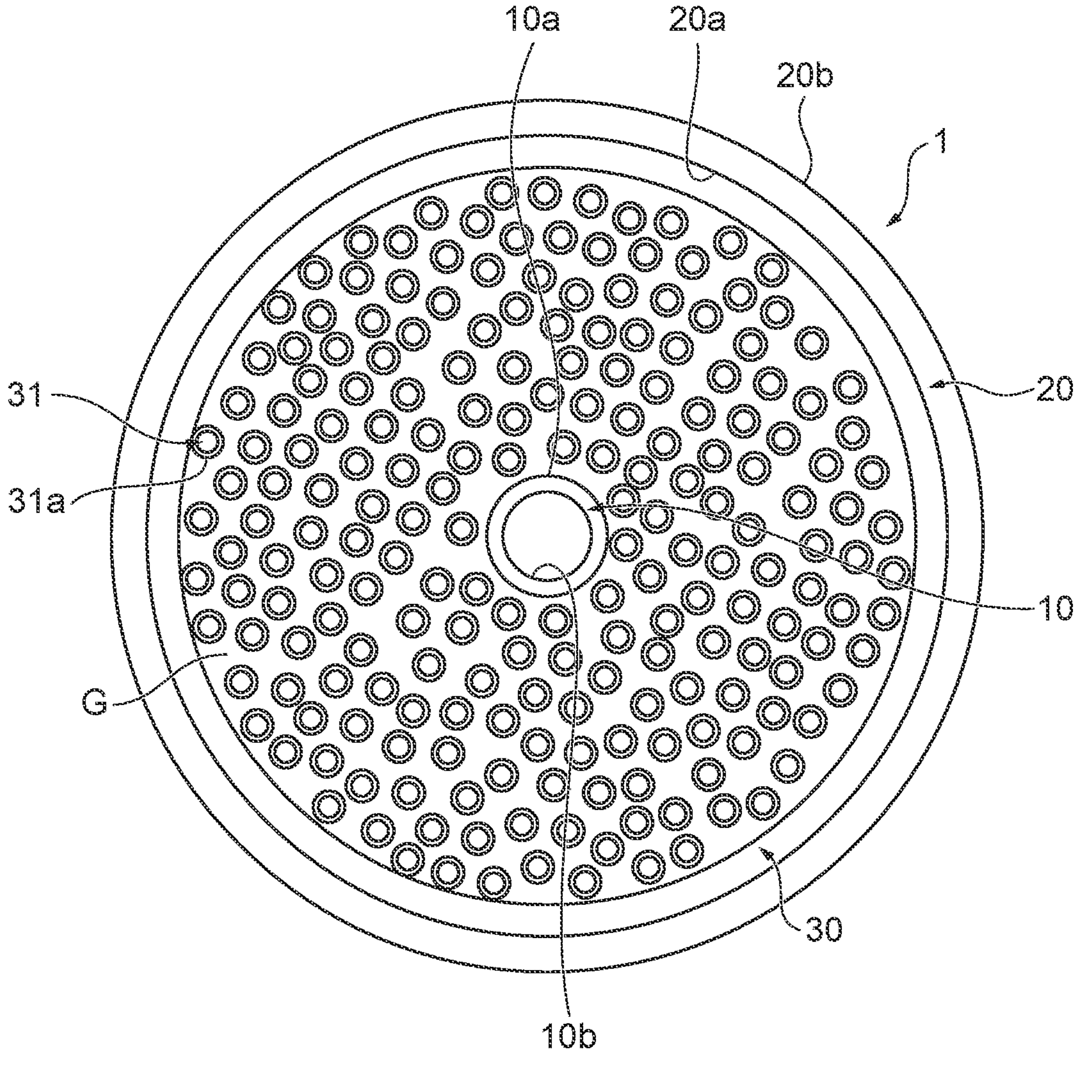
FIG. 2 A sectional view in a section intersecting the extending direction of the hollow fiber membrane module illustrated in FIG. 1.

FIG. 1 is a sectional view in a section along an extending direction (axis x) illustrating an overview configuration of a hollow fiber membrane module 1 according to an embodiment of the present disclosure. FIG. 2 is a sectional view in a section (A-A section) intersecting the extending direction of the hollow fiber membrane module 1. Hereinafter, for convenience for explanation, an arrow a direction side in the axis x direction will be defined as an upstream side, and an arrow b direction side will be defined as a downstream side. Also, a side of a direction (an arrow c direction in FIG. 1) separated from the axis x in a direction perpendicular to the axis x (hereinafter, also referred to as a "radial direction") will be defined as an outer periphery side, and a side of a direction (an arrow d direction in FIG. 1) approaching the axis x will be defined as an inner periphery side.

The hollow fiber membrane module 1 according to the embodiment of the present disclosure is used as a dehumidification module or a humidification module of a dehumidification/humidification device. For example, the hollow fiber membrane module 1 is used as a humidification module of a humidification device for a fuel cell. Specifically, the hollow fiber membrane module 1 is used as a humidification module of a humidification device for humidifying an electrolyte membrane of a fuel cell. For example, reaction gas supplied for power generation is humidified by using reaction gas (off gas) after used for power generation which contains moisture generated by a chemical reaction for power generation and by utilizing a membrane separation effect of the hollow fiber membrane. The reaction gas to be supplied for power generation is fuel gas such as hydrogen and oxidant gas such as oxygen.

The hollow fiber membrane module 1 includes an inner case 10 that is a member with a tubular shape, an outer case 20 that is a member with a tubular shape covering the inner case 10 from an outer periphery side with a space (space S) left therebetween, and a plurality of hollow fiber membranes 31 that are provided in the space S between the inner case 10 and the outer case 20 as illustrated in FIG. 1. The inner case 10 includes an introduction portion 13 that is a part establishing communication between inside of the inner case 10 and outside of the inner case 10 on a side of one (upstream side) end in an extending direction (axis x direction) of the inner case 10 and the outer case 20. The outer case includes a discharge portion 23 that is a part establishing communication between inside of the outer case 20 and outside of the outer case 20 on a side of another (downstream side) end in the extending direction. The inner case 10 includes a bypass portion 14 that is a part establishing communication between the inside of the inner case 10 and the outside of the inner case 10 on the side of the another end in the extending direction. The bypass portion 14 includes at least one bypass port 15 that penetrates through the inner case 10 between the inside and the outside. Hereinafter, a configuration of the hollow fiber membrane module 1 according to the embodiment of the disclosure of the present application will be specifically described.

Figure 3:
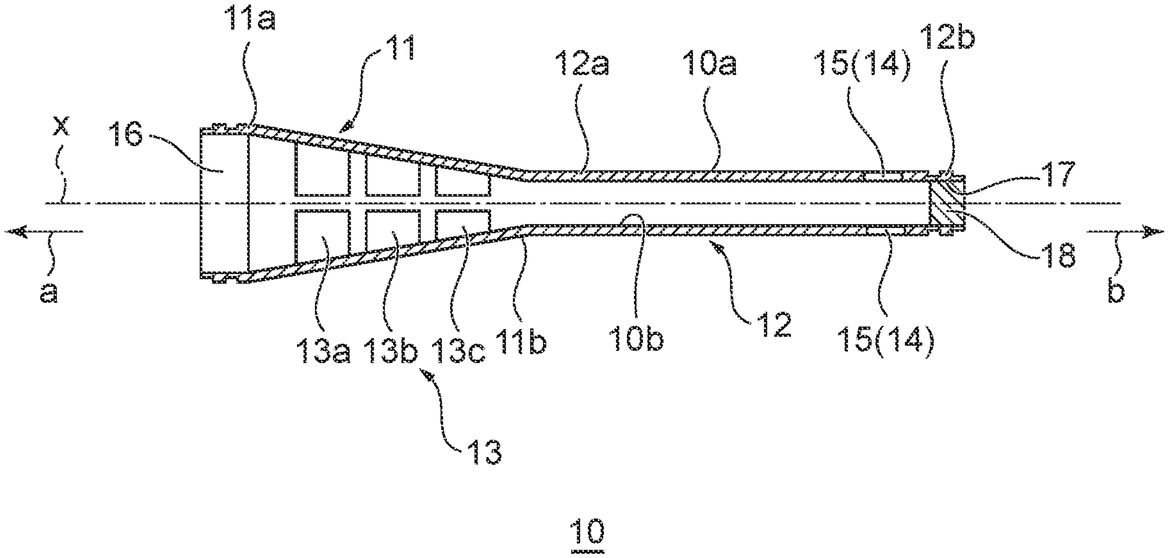
FIG. 3 A sectional view in a section along an extending direction of an inner case of the hollow fiber membrane module illustrated in FIG. 1.
Figure 4:
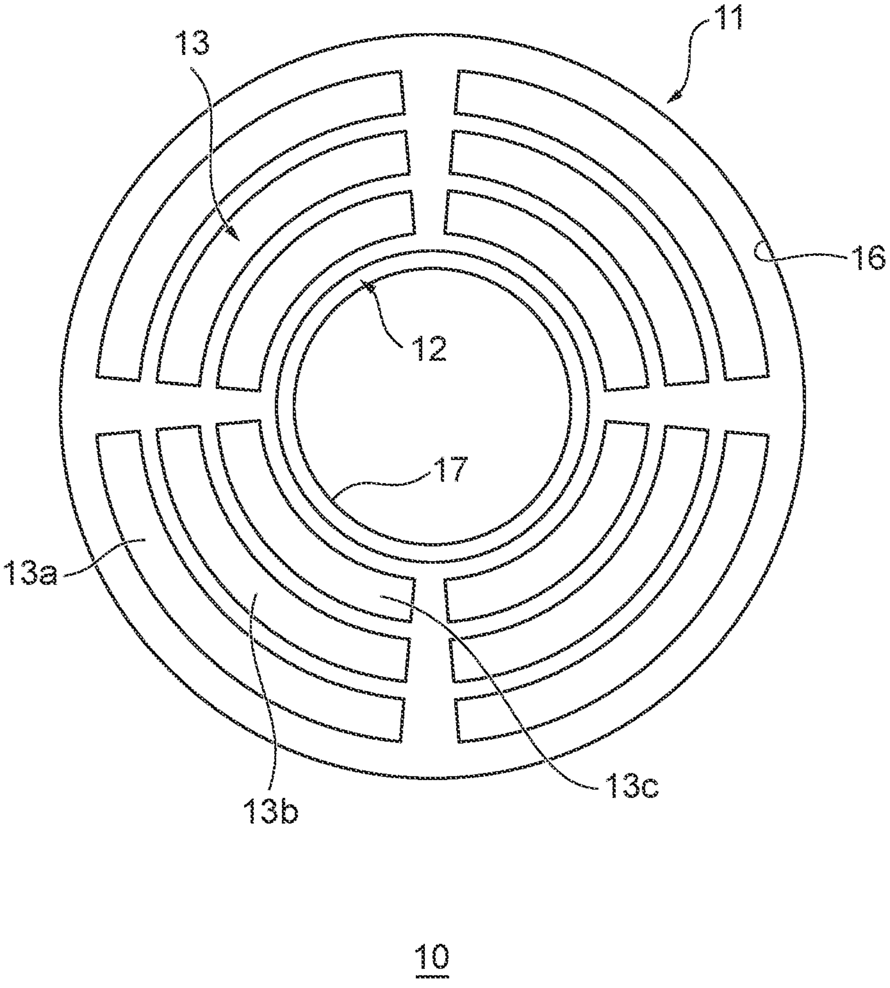
FIG. 4 A plan view of the inner case illustrated in FIG. 3.

FIG. 3 is a sectional view in a section along the extending direction (axis x) of the inner case 10, and FIG. 4 is a plan view of the inner case 10 and is a view of the inner case 10 seen from the upstream side. The inner case 10 is a member with a tubular shape as described above and is a member with a tubular shape extending along the axis x as illustrated in FIGS. 1 and 3, for example. Specifically, the inner case 10 includes an upstream main body portion 11 as one end portion with a tubular shape that is a part on the upstream side and a downstream main body portion 12 as another end portion with a tubular shape that is a part on the downstream side and connects to the upstream main body portion 11 on the downstream side, and the inner case 10 is shaped by the upstream main body portion 11 and the downstream main body portion 12.

The upstream main body portion 11 extends along the axis x, has a diameter reduced as progress from the upstream side to the downstream side in the axis x direction, and has a truncated cone tubular or substantially truncated cone tubular shape that narrows toward the downstream side, for example. The upstream main body portion 11 is hollow, a space extends along the axis x inside the upstream main body portion 11, and the upstream main body portion 11 includes an opening 16 at an upstream end portion 11*a* that is an end portion on the upstream side. The opening 16 opens the internal space of the upstream main body portion 11 to outside of the upstream main body portion 11 toward the upstream side. In other words, the inside of the upstream main body portion 11 communicates with the outside via the opening 16. Also, a downstream end portion 11*b* that is an end portion of the upstream main body portion 11 on the downstream side connects to an upstream end portion 12*a* of the downstream main body portion 12, which will be described later, and the inner space of the upstream main body portion 11 communicates with inside of the downstream main body portion 12.

The downstream main body portion 12 extends along the axis x, has a constant or substantially constant width in the radial direction over the axis x direction, and has a cylindrical or substantially cylindrical shape extending along the axis x, for example. The downstream main body portion 12 is hollow, a space extends along the axis x inside the downstream main body portion 12, and the downstream main body portion 12 includes an opening 17 at the downstream end portion 12*b* that is an end portion on the downstream side. The opening 17 opens the inside of the downstream main body portion 12 to outside of the downstream main body portion 12 toward the downstream side. In other words, the inside of the downstream main body portion 12 communicates with the outside via the opening 17. Also, the upstream end portion 12*a* that is an end portion of the downstream main body portion 12 on the upstream side connects to the downstream end portion 11*b* of the upstream main body portion 11, and the inside of the downstream main body portion 12 communicates with the inside of the upstream main body portion 11, as described above.

The introduction portion 13 that establishes communication between the inside and the outside of the aforementioned inner case 10 is provided at the upstream main body portion 11. Specifically, the introduction portion 13 is provided on a side further downstream than the opening 16 in the upstream main body portion 11, and the introduction portion 13 establishes communication between the inside of the inner case 10 and the inside (space S) of the outer case 20 in the hollow fiber membrane module 1, as illustrated in FIG. 3. Also, the introduction portion 13 includes a plurality of introduction ports 13*a* to 13*c* and is configured by these plurality of introduction ports 13*a* to 13*c*. The introduction ports 13*a* to 13*c* are openings that penetrate through the inner case 10 between the inside and the outside.

Specifically, the introduction portion 13 includes the plurality of introduction ports 13*a* aligned at equal angular intervals or substantially equal angular intervals in the circumferential direction at a same position or substantially a same position in the axis x direction as illustrated in FIGS. 3 and 4. The introduction ports 13*a* have widths in the circumferential direction narrowed as progress from the upstream side toward the downstream side to follow the shape of the upstream main body portion 11 with a tapered shape. In addition, the introduction portion 13 includes a plurality of introduction ports 13*b* aligned at equal angular intervals or substantially equal angular intervals in the circumferential direction at a same position or substantially a same position in the axis x direction on a side further downstream than the introduction ports 13*a*. The introduction ports 13*b* have widths in the circumferential direction narrowed as progress from the upstream side toward the downstream side to follow the shape of the upstream main body portion 11 with a tapered shape similarly to the introduction ports 13*a*. Moreover, the introduction portion 13 includes a plurality of introduction ports 13*c* aligned at equal angular intervals or substantially equal angular intervals in the circumferential direction at a same position or substantially a same position in the axis x direction on a side further downstream than the introduction ports 13*b*. The introduction ports 13*c* have widths in the circumferential direction narrowed as progress from the upstream side toward the downstream side to follow the shape of the upstream main body portion 11 with a tapered shape similarly to the introduction ports 13*a* and 13*b*. Also, the widths of the introduction ports 13*b* in the circumferential direction are narrower than the widths of the introduction ports 13*a* in the circumferential direction, the widths of the introduction ports 13*c* in the circumferential direction are narrower than the widths of the introduction ports 13*b* in the circumferential direction, and the widths of the introduction ports 13*a* to 13*c*, which the introduction portion 13 includes, in the circumferential direction decrease as progress toward the downstream side. In this manner, the introduction portion 13 is formed by arrays, in each of which the plurality of introduction ports 13*a*, 13*b*, and 13*c* are aligned in the circumferential direction, being aligned in the axis x direction.

Note that the form of the introduction portion 13 is not limited to the aforementioned form and may be any form as long as it establishes communication between the inside and the outside of the inner case 10. For example, although the introduction portion 13 is assumed to be formed by the introduction port groups in three arrays, in each of which the plurality of introduction ports 13*a*, 13*b*, and 13*c* are aligned in the circumferential direction, being aligned in the axis x direction, the introduction portion 13 is not limited to one formed by the introduction port groups in three arrays and may be one formed by an introduction port group in one array or introduction port groups in another number of multiple arrays. Also, each array may not be an introduction port group configured of a plurality of introduction ports 13*a*, introduction ports 13*b* or 13*c* and may be configured of one introduction port 13*a* or introduction port 13*b* or 13*c*. Moreover, the shape of each of the introduction ports 13*a* to 13*c* is not limited to the aforementioned shape with the width in the circumferential direction narrowed as progress from the upstream side toward the downstream side and may be a shape with a width in the circumferential direction widened as progress from the upstream side toward the downstream side, a shape width a constant width in the circumferential direction from the upstream side to the downstream side, or the like, or another shape such as a circular shape. Also, the plurality of introduction ports 13*a* in each array may not have mutually the same shape and size, and similarly, each of the plurality of introduction ports 13*b* and 13*c* may not have mutually the same shape and size. The form of the introduction portion 13 can be various forms in accordance with utilization aspects of the hollow fiber membrane module 1.

The aforementioned bypass portion 14 that establishes communication between the inside and the outside of the inner case 10 is provided at the downstream main body portion 12. Specifically, the bypass portion 14 is provided at or in a vicinity of the downstream end portion 12*b* of the downstream main body portion 12 as illustrated in FIG. 3. Also, the bypass portion 14 is provided at a position that at least partially faces the discharge portion 23 of the outer case 20 in the radial direction. As illustrated in FIGS. 1 and 3, for example, the bypass portion 14 is provided in a vicinity of the downstream end portion 12*b* on the upstream side and is provided at a position facing the discharge portion 23 of the outer case 20 in the radial direction or in the vicinity of the facing position. The position at which the bypass portion 14 is provided at the downstream main body portion 12 of the inner case 10 is not limited thereto.

The bypass portion 14 includes at least one bypass ports 15 that is an opening penetrating through the inner case 10 between the inside and the outside. As illustrated in FIG. 2, for example, the bypass portion 14 includes a plurality of bypass ports 15 aligned at equal angular intervals or substantially equal angular intervals in the circumferential direction at a same position or substantially a same position in the axis x direction. In the illustrated example, the bypass portion 14 includes two bypass ports 15 facing or substantially facing each other in the radial direction. The bypass ports 15 are openings with rectangular shapes, for example. The plurality of bypass ports 15 may have mutually the same shape and size or may not have mutually the same shape and size. Also, the number of bypass ports 15 that the bypass portion 14 has is not limited to that in the illustrated example and may be one or three or more. The plurality of bypass ports 15 may not be aligned at equal angular intervals in the circumferential direction, and may be aligned in another predetermined pattern, or may be irregularly aligned. Moreover, the plurality of bypass ports 15 may not be provided at the same position in the axis x direction, and for example, the bypass ports 15 may be arranged to depict a zigzag shape in the circumferential direction. Also, the shape of the bypass ports 15 is not limited to the rectangular shape and may be a circular shape or another shape.

The bypass portion 14 is not limited to one including one bypass port array in which the plurality of bypass ports 15 are aligned in the circumferential direction as illustrated in the drawing and may be one formed by a plurality of bypass port arrays being aligned in the axis x direction. In this case, the bypass portion 14 may include the bypass ports 15 with mutually the same shape and size or may include the bypass ports 15 that do not have mutually the same shape and size.

The inner case 10 has the aforementioned structure, a space continues inside the inner case 10 along the axis x from the opening 16 on the upstream side to the opening 17 on the downstream side, and a member such as a wall portion that splits the space inside the inner case 10 is not formed. Also, the space inside the inner case 10 is adapted to communicate with the space S, which is a space inside the outer case 20, via the introduction ports 13*a* to 13*c* of the introduction portion 13 formed at the upstream main body portion 11. Also, the space inside the inner case 10 is adapted to communicate with the space S inside the outer case 20 via the bypass ports 15 of the bypass portion 14 formed at the downstream main body portion 12. In this manner, the space inside the inner case 10 is adapted to communicate with the space S inside the outer case 20 via the introduction ports 13*a* to 13*c* of the introduction portion 13 on the upstream side and via the bypass ports 15 of the bypass portion 14 on the downstream side in the hollow fiber membrane module 1.

The form of the inner case 10 is not limited to the aforementioned form and may be another form. For example, the upstream main body portion 11 of the inner case 10 may have a cylindrical shape or substantially a cylindrical shape similarly to the downstream main body portion 12 instead of the tapered shape, and the inner case 10 may extend in a cylindrical shape or substantially a cylindrical shape along the axis x as a whole.

The outer case 20 is a member with a tubular shape extending in the extending direction as described above and is, for example, a member with a tubular shape extending along the axis x as illustrated in FIG. 1. Specifically, the outer case 20 has a form corresponding to the inner case 10, extends concentrically or substantially concentrically with the inner case 10 in regard to the axis x, and has a same or substantially a same length in the axis x direction as a length of the inner case 10 in the axis x direction. Specifically, the outer case 20 includes an upstream main body portion 21 with a tubular shape that is a part on the upstream side and a downstream main body portion 22 with a tubular shape that is a part on the downstream side and connects to the upstream main body portion 21 on the down stream side as illustrated in FIG. 1.

The upstream main body portion 21 extends along the axis x, has a diameter reduced as progress from the upstream side to the downstream side in the axis x direction, and has a truncated cone tubular or substantially truncated cone tubular shape that narrows toward the downstream side, for example. The upstream main body portion 21 is hollow, a space extends along the axis x inside the upstream main body portion 21, and the upstream main body portion 21 includes an opening 24 at an upstream end portion 21*a* that is an end portion on the upstream side. The opening 24 opens the inside of the upstream main body portion 21 to the outside of the upstream main body portion 21 toward the upstream side. In other words, the inside of the upstream main body portion 21 communicates with the outside via the opening 24. Also, a downstream end portion 21*b* that is an end portion of the upstream main body portion 21 on the downstream side connects to an upstream end portion 22*a* of the downstream main body portion 22, which will be described later, and inside of the upstream main body portion 21 communicates with inside of the downstream main body portion 22.

The downstream main body portion 22 extends along the axis x, has a constant or substantially constant width in the radial direction over the axis x direction, and has a cylindrical or substantially cylindrical shape extending along the axis x, for example. The downstream main body portion 22 is hollow, a space extends along the axis x inside the downstream main body portion 22, and the downstream main body portion 22 includes an opening 25 at a downstream end portion 22*b* that is an end portion on the downstream side. The opening 25 opens the inside of the downstream main body portion 22 to the outside of the downstream main body portion 22 toward the downstream side. In other words, the inside of the downstream main body portion 22 communicates with the outside via the opening 25. Also, the upstream end portion 22*a* that is an end portion of the downstream main body portion 22 on the upstream side connects to the downstream end portion 21*b* of the upstream main body portion 21, and the inside of the downstream main body portion 22 communicates with the inside of the upstream main body portion 21, as described above.

A length of the upstream main body portion 21 of the outer case 20 in the axis x direction is the same or substantially the same as a length of the upstream main body portion 11 of the inner case 10 in the axis x direction, and a length of the downstream main body portion 22 of the outer case 20 in the axis x direction is the same or substantially the same as a length of the downstream main body portion 12 of the inner case 10 in the axis x direction. Therefore, in the hollow fiber membrane module 1, the upstream end portion 21*a* of the upstream main body portion 21, the downstream end portion 21*b* of the upstream main body portion 21, the upstream end portion 22*a* of the downstream main body portion 22, and the downstream end portion 22*b* of the downstream main body portion 22 of the outer case 20 are located at the same or substantially the same positions as the positions of the upstream end portion 11*a* of the upstream main body portion 11, the downstream end portion 11*b* of the upstream main body portion 11, the upstream end portion 12*a* of the downstream main body portion 12, and the downstream end portion 12*b* of the downstream main body portion 12 of the inner case 10, respectively, in the axis x direction.

In addition, the outer case 20 has a form corresponding to the inner case 10, the upstream main body portion 21 of the outer case 20 extends in the axis x direction in parallel with or in substantially parallel with the upstream main body portion 11 of the inner case 10, and the downstream main body portion 22 of the outer case 20 extends in the axis x direction in parallel with or in substantially parallel with the downstream main body portion 12 of the inner case 10. Therefore, in the hollow fiber membrane module 1, the space S with a hollow tubular shape and with an annular or donut-like sectional shape formed between the outer case 20 and the inner case 10 has a constant or substantially constant width in the radius direction over the width in the axis x direction.

The form of the outer case 20 is not limited to the aforementioned form and may be another form. For example, the upstream main body portion 21 may not have a tapered shape and may have a cylindrical shape or substantially a cylindrical shape in the outer case 20 similarly to the downstream main body portion 22, and the outer case 20 may extend in a cylindrical shape or substantially a cylindrical shape along the axis x as a whole. In addition, the upstream main body portion 21 of the outer case 20 may not extend in the axis x direction in parallel with the upstream main body portion 11 of the inner case 10, and the downstream main body portion 22 of the outer case 20 may not extend in the axis x direction in parallel with the downstream main body portion 12 of the inner case 10.

The discharge portion 23 that establishes communication between the inside and the outside of the aforementioned outer case 20 is provided at the downstream main body portion 22. Specifically, the discharge portion 23 is provided at or in a vicinity of the downstream end portion 22*b* in the downstream main body portion 22, and the discharge portion 23 is provided on a side further upstream than the opening 25, as illustrated in FIG. 1. The discharge portion 23 establishes communication between the inside (space S) of the outer case 20 and the outside of the outer case 20 in the hollow fiber membrane module 1. Also, the discharge portion 23 forms an opening extending in an endless annular strip shape around the axis x. As illustrated in FIG. 1, for example, the discharge portion 23 is provided at a position facing the bypass portion 14 of the inner case 10 in the radial direction or in a vicinity of the facing position. The position at which the discharge portion 23 is provided at the downstream main body portion 22 of the outer case 20 is not limited thereto.

Also, the form of the discharge portion 23 is not limited to one in which the opening extending in an endless annular strip shape around the axis x is formed. For example, the discharge portion 23 may be one configured of a plurality of openings that penetrate through the outer case 20 between the inside and the outside. In this case, the plurality of openings configuring the discharge portion 23 are aligned at equal angular intervals or substantially equal angular intervals in the circumferential direction at a same position or substantially a same position in the axis x direction, for example. Arrangement of the plurality of openings configuring the discharge portion 23 may be other arrangement.

As described above, the plurality of hollow fiber membranes 31 are provided in the space S between the inner case 10 and the outer case 20. Specifically, the space S is filled with a hollow fiber membrane bundle 30 that is a bundle of hollow fiber membranes 31. The hollow fiber membrane bundle 30 has a tubular shape as illustrated in FIGS. 1 and 2, for example. In the hollow fiber membrane bundle 30, each hollow fiber membrane 31 extends along the axis x direction, an opening (upstream opening 31*a*) on one end side (upstream side) of each hollow fiber membrane 31 is located at an upstream end 30*a* that is an end of the hollow fiber membrane bundle 30 facing the upstream side, and an opening (downstream opening 31*b*) on another end side (downstream side) of each hollow fiber membrane 31 is located at a downstream end 30*b* that is an end of the hollow fiber membrane bundle 30 facing the downstream side. The hollow fiber membrane bundle 30, as illustrated in FIG. 1, for example, has a shape in which the hollow fiber membranes 31 forming a boundary on the inner periphery side extend along the outer peripheral surface 10*a* of the inner case 10, the hollow fiber membranes 31 forming a boundary on the outer periphery side extend along an inner peripheral surface 20*a* of the outer case 20, and the hollow fiber membrane bundle 30 follows the outer peripheral surface 10*a* of the inner case 10 and the inner peripheral surface 20*a* of the outer case 20. The shape of the hollow fiber membrane bundle 30 is not limited to the shape following the outer peripheral surface 10*a* of the inner case 10 and the inner peripheral surface 20*a* of the outer case 20 in this manner and may be another shape. For example, the hollow fiber membrane bundle 30 may have a cylindrical or substantially cylindrical shape extending along the axis x or may have a conical tubular or substantially conical tubular shape extending along the axis x.

In the hollow fiber membrane bundle 30, clearances through which fluid can pass are formed between mutually adjacent hollow fiber membranes 31 as illustrated in FIG. 2. Also, clearances through which liquid or gas can pass are preferably formed between the hollow fiber membranes 31 forming the boundary of the hollow fiber membrane bundle 30 on the inner periphery side and the outer peripheral surface 10*a* of the inner case 10, and clearances through which liquid or gas can pass are preferably formed between the hollow fiber membranes 31 forming the boundary of the hollow fiber membrane bundle 30 on the outer periphery side and the inner peripheral surface 20*a* of the outer case 20. Note that although clearances through which fluid can pass are preferably formed over the entirety in the axis x direction between the mutually adjacent hollow fiber membranes 31, the clearances through which fluid can pass may not be formed over the entirety in the axis x direction.

The hollow fiber membranes 31 are adapted to have a membrane separation effect of causing moisture in humid gas to move to a side of dry gas between the inside and the outside of the hollow fiber membranes 31 and are created into hollow pipe shapes. As a material of the hollow fiber membranes 31, it is possible to suitably use polyphenylsulfone (PPSU) that has a property of transmitting moisture by a capillary condensation mechanism based on pore diameter control, for example. Note that it is possible to obtain hollow fiber membranes with hydrophilicity by performing spinning by using a film forming solution to which PPSU and a hydrophilic polymer (polyvinylpyrrolidone) are added. Also, it is possible to use Nafion (registered trademark) having a property of transmitting moisture through dissolution diffusion as a material of the hollow fiber membranes 31.

Also, as illustrated in FIG. 1, the hollow fiber membrane module 1 includes sealing portions 35 and 36 (a one-end-side sealing portion and an other-end-side sealing portion) for achieving tight closure of openings that open the spaces S formed by each of the openings 24 and 25 of the outer case 20 to the outside of the hollow fiber membrane module 1. Specifically, the sealing portion 35 is provided at the opening 24 of the outer case 20 on the upstream side, is in contact with the inner peripheral surface 20*a* of the outer case 20 over the entire periphery at the opening 24 of the outer case 20, and is in contact with the outer peripheral surface 10*a* of the inner case 10 over the entire periphery at the opening 24 of the outer case 20. Also, the sealing portion 35 is in contact with an outer peripheral surface 31*c* of each hollow fiber membrane 31 over the entire periphery at the opening 24 of the outer case 20. Moreover, each hollow fiber membrane 31 penetrates through the sealing portion 35 at an end portion on the upstream side, and the upstream opening 31*a* of each hollow fiber membrane 31 opens the inside of the hollow fiber membrane 31 to a space outside the sealing portion 35. Specifically, the sealing portion 36 is similarly provided at the opening 25 of the outer case 20 on the downstream side, is in contact with the inner peripheral surface 20*a* of the outer case 20 over the entire periphery at the opening 25 of the outer case 20, and is in contact with the outer peripheral surface 10*a* of the inner case 10 over the entire periphery at the opening 25 of the outer case 20. Additionally, the sealing portion 36 is in contact with the outer peripheral surface 31*c* of each hollow fiber membrane 31 over the entire periphery at the opening 25 of the outer case 20. Moreover, each hollow fiber membrane 31 penetrates through the sealing portion 36 at an end portion on the downstream side, and the downstream opening 31*b* of each hollow fiber membrane 31 opens the inside of the hollow fiber membrane 31 to the space outside the sealing portion 36.

In this manner, tight sealing of the opening (opening 24) that opens the space S on the upstream side is achieved by the sealing portion 35, tight sealing of the opening (opening 25) that opens the space S on the downstream side is achieved by the sealing portion 36, and on the other hand, the space inside each hollow fiber membrane 31 is opened to the outside of the hollow fiber membrane module 1 via the upstream opening 31*a* and the downstream opening 31*b*. In addition, each hollow fiber membrane 31 is fixed to the inner case 10 and the outer case 20 with the sealing portions 35 and 36, respectively, at the end portions on the upstream side and the downstream side. The hollow fiber membranes 31 are fixed into a bundle shape, and the hollow fiber membrane bundle 30 is thus formed, through the fixation of the hollow fiber membranes 31 with the sealing portions 35 and 36. The sealing portions 35 and 36 are members formed by a potting material, such as an epoxy resin, for example, being cured.

Also, as illustrated in FIGS. 1 and 3, the hollow fiber membrane module 1 includes a sealing portion 18 (inner case sealing portion) that achieves tight closure of the opening 17 at the downstream end portion 12*b* of the inner case 10. The sealing portion 18 is in contact with the inner peripheral surface 10*b* of the inner case 10 over the entire periphery at the opening 17 of the inner case 10. The sealing portion 18 is a member formed by a potting material such as an epoxy resin being cured, for example. The sealing portion 18 is located on a side further downstream than the bypass ports 15 of the bypass portion 14 in the inner case 10.

The hollow fiber membrane module 1 has the configuration as described above and includes two fluid paths communicating with the outside. One is a first fluid path F1, which is a fluid path formed by each hollow fiber membrane 31, and is a fluid path formed by the upstream opening 31*a*, the inside of the hollow fiber membrane 31, and the downstream opening 31*b*. Another one is a second fluid path F2, which is a fluid path extending between the opening 16 of the inner case 10 on the upstream side and the discharge portion 23 of the outer case 20 and is formed by the opening 16 of the inner case 10, the internal space of the inner case 10, the introduction portion 13 of the inner case 10, a space G between the mutually adjacent hollow fiber membranes 31 in the space S, and the discharge portion 23 of the outer case 20.

Also, the bypass portion 14 constituted by the bypass ports 15 is provided on the downstream side in the inner case 10 of the hollow fiber membrane module 1, and the inside of the inner case 10 and the space 2 establish communication via the bypass portion 14 on the downstream side. Therefore, the hollow fiber membrane module 1 includes a third fluid path F3 formed by the inside of the inner case 10, the bypass portion 14 of the inner case 10, the space G between the mutually adjacent hollow fiber membranes 31 in the space S, and the discharge portion 23 of the outer case 20.

Figure 5:
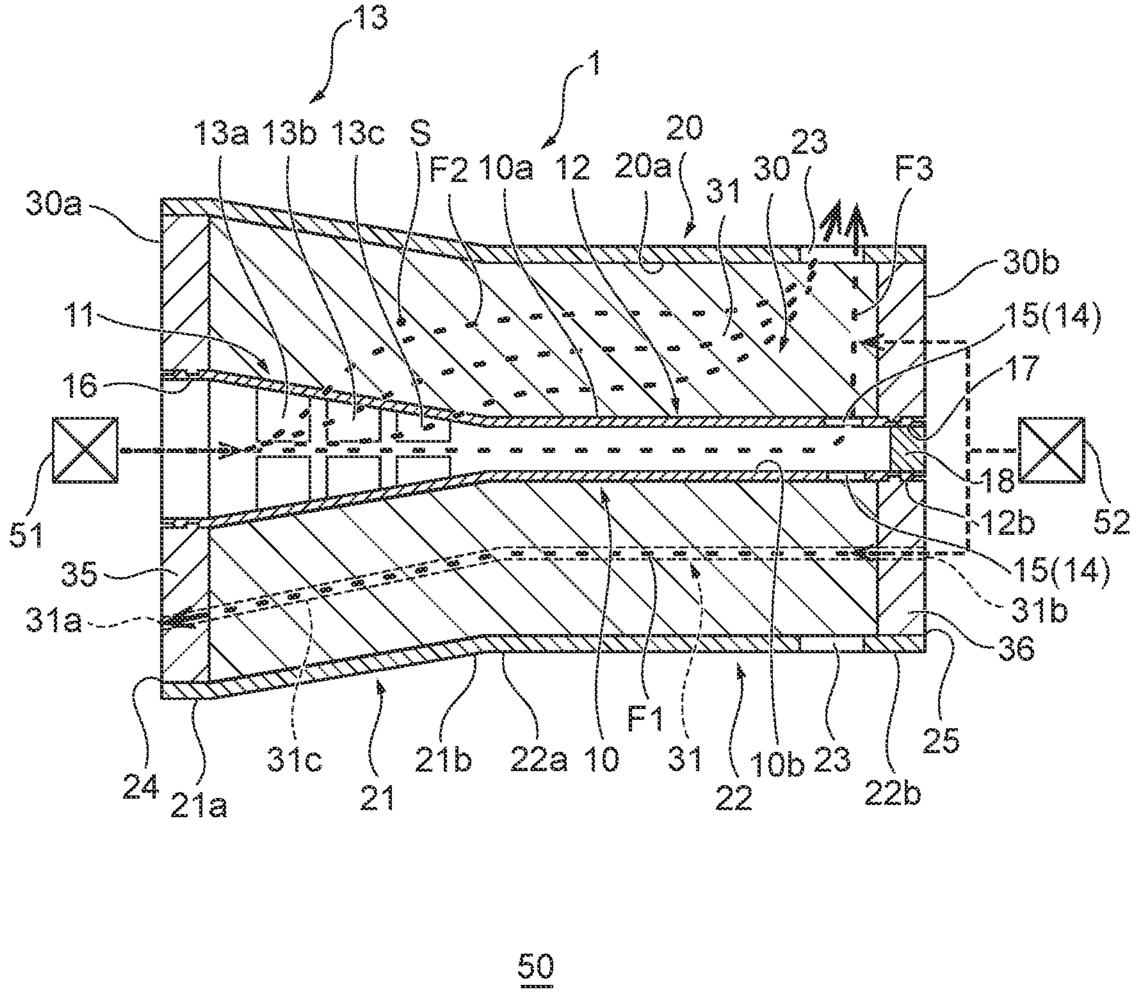
FIG. 5 A view for explaining acts of the hollow fiber membrane module according to the embodiment of the present disclosure and illustrating an overview configuration of a humidification device that includes the hollow fiber membrane module according to the embodiment of the present disclosure.

Next, effects of the hollow fiber membrane module 1 with the configuration as described above will be described. FIG. 5 is a view for explaining effects of the hollow fiber membrane module 1, and the hollow fiber membrane module 1 in a usage state is illustrated in a section. In FIG. 5, the first, second, and third fluid paths F1, F2, and F3 are schematically illustrated.

As described above, the hollow fiber membrane module 1 is used as a dehumidification module or a humidification module of a dehumidification/humidification device. In the illustrated example, the hollow fiber membrane module 1 is used as a humidification module of a humidification device for a fuel cell and is in a usage state by being attached to a humidification device 50 for a fuel cell.

As illustrated in FIG. 5, the humidification device 50 includes the hollow fiber membrane module 1, a humid gas supply device 51, and a dry gas supply device 52. The humid gas supply device 51 is adapted to supply humid gas to the second fluid path F2 of the hollow fiber membrane module 1. In addition, the dry gas supply device 52 is adapted to supply dry gas, which has a lower humidity than the humid gas to be supplied from the humid gas supply device 51, to the first fluid path F1 formed by each hollow fiber membrane 31. The humid gas that the humid gas supply device 51 supplies is off gas after reaction gas supplied for power generation in the fuel cell causes a chemical reaction, and the dry gas that the dry gas supply device 52 supplies is reaction gas to be supplied for power generation. In the present embodiment, the dry gas to be supplied from the dry gas supply device 52 is oxidant gas such as oxygen in the reaction gas, and the humid gas is oxidant off gas in the off gas after the oxidant gas such as oxygen is used for power generation.

Once the humidification device 50 is activated, the humid gas is supplied from the humid gas supply device 51 to the second fluid path F2 of the hollow fiber membrane module 1, and the dry gas is supplied from the dry gas supply device 52 to the first fluid path F1 of the hollow fiber membrane module 1. In this manner, the dry gas flows inside each hollow fiber membrane 31, the humid gas flows in the space G between the mutually adjacent hollow fiber membranes 31 in the space S, and the dry gas and the humid gas contact with each other via the hollow fiber membranes 31. At this time, moisture in the humid gas moves to a side of the dry gas by the membrane separation effect of the hollow fiber membranes 31. In this manner, the dry gas flowing through the first fluid path F1 is humidified, is discharged from the upstream opening 31*a* of each hollow fiber membrane 31, and is discharged from the hollow fiber membrane module 1. The humidified dry gas (oxidant gas) is supplied as reaction gas for the fuel cell to an electrolyte membrane of the fuel cell. In this manner, the electrolyte membrane of the fuel cell is humidified. On the other hand, the humid gas that has humidified the dry gas is discharged from the hollow fiber membrane module 1.

The hollow fiber membrane module 1 has the configuration as described above and includes two fluid paths communicating with the outside. One is the first fluid path F1 formed by each hollow fiber membrane 31, which is a fluid path formed by the upstream opening 31*a*, the inside of the hollow fiber membrane 31, and the downstream opening 31*b*. The other is the second fluid path F2, which is a fluid path extending between the opening 16 of the inner case 10 on the upstream side and the discharge portion 23 of the outer case 20 and is formed by the opening 16 of the inner case 10, the internal space of the inner case 10, the introduction portion 13 of the inner case 10, the space G between the mutually adjacent hollow fiber membranes 31 in the space S, and the discharge portion 23 of the outer case 20.

Specifically, the humid gas to be supplied from the humid gas supply device 51 enters the inside of the inner case 10 from the opening 16 of the inner case 10 on the upstream side and advances to the downstream side inside the inner case 10. Then, a part of the humid gas advancing to the downstream side inside the inner case 10 flows to the space S via each of the introduction ports 13*a* to 13*c* of the introduction portion 13. The humid gas that has flowed into the space S from the introduction portion 13 flows through the space G between the mutually adjacent hollow fiber membranes 31 in the space S, contacts with the hollow fiber membranes 31, humidifies the dry air flowing inside the hollow fiber membranes 31 by the membrane separation effect of the hollow fiber membranes 31, is discharged from the space S via the discharge portion 23 of the outer case 20, and is discharged from the hollow fiber membrane module 1.

The upstream main body portion 11 of the inner case 10 has a diameter reduced as progress from the upstream side toward the downstream side, and the introduction ports 13*a* to 13*c* are formed at the upstream main body portion 11. Therefore, gas flowing out to the space S from the introduction ports 13*a* to 13*c* has a trend that the gas flowing out in a direction inclined with respect to the axis x. In this manner, the humid gas flowing out to the space S from the introduction ports 13*a* to 13*c* is likely to flow in a direction inclined with respect to the axis x through the space G between the mutually adjacent hollow fiber membranes 31 in the space S, and the humid gas is likely to flow against dry gas passing through the inside of the hollow fiber membranes 31. Also, each of the introduction ports 13*a* to 13*c* has a width in the circumferential direction narrowed as progress from the upstream side toward the downstream side. This also enables the gas flowing out to the space S from the introduction ports 13*a* to 13*c* to have a trend that the gas flows out in the direction inclined with respect to the axis x.

Additionally, the humid gas flows into a region on the inner periphery side and on the upstream side of the space S via the introduction portion 13 and is discharged from a region on the outer periphery side and on the downstream side of the space S via the discharge portion 23. Therefore, the humid gas flowing into the inside of the space S can contact with the entire hollow fiber membranes 31 of the hollow fiber membrane bundle 30, and the entire hollow fiber membranes 31 of the hollow fiber membrane bundle 30 can exhibit the membrane separation effect.

In this manner, the hollow fiber membrane module 1 is devised such that the humid gas that has flows out to the space S from the introduction ports 13*a* to 13*c* is likely to flow while facing the dry gas passing through the inside of the hollow fiber membranes 31, and the entire hollow fiber membranes 31 of the hollow fiber membrane bundle 30 exhibit the membrane separation effect. Therefore, the membrane separation action of the hollow fiber membrane bundle 30 is efficiently executed, and high humidification performance is obtained, in the hollow fiber membrane module 1.

On the other hand, specifically, the dry gas supplied from the dry gas supply device 52 enters the inside of the hollow fiber membranes 31 from the downstream opening 31*b* of each hollow fiber membrane 31 and advances to the upstream side inside the hollow fiber membranes 31. Then, the dry gas advancing to the upstream side inside the hollow fiber membranes 31 is humidified by the humid air that contacts with the hollow fiber membranes 31 due to the membrane separation action of the hollow fiber membranes 31, is discharged from the upstream opening 31*a* of the hollow fiber membrane 31, and is discharged from the hollow fiber membrane module 1.

A part of the humid gas supplied from the humid gas supply device 51 and advancing through the inside of the inner case 10 to the downstream side is supplied to the third fluid path F3. Specifically, a part of the humid gas supplied from the humid gas supply device 51 and advancing through the inside of the inner case 10 to the downstream side continuously advances through the inside of the inner case 10 to the downstream side without flowing out to the space S from the introduction ports 13*a* to 13*c*. A part of the humid gas continuously advancing through the inside of the inner case 10 to the downstream side flows out to the space S via the bypass ports 15 of the bypass portion 14 formed on the downstream side of the inner case 10. The humid gas that has flowed out to the space S from the bypass portion 14 flows through the space G between the mutually adjacent hollow fiber membranes 31 in the space S, contacts with the hollow fiber membranes 31, humidifies the dry air flowing inside the hollow fiber membranes 31 due to a membrane separation action of the hollow fiber membranes 31, is discharged from the space S via the discharge portion 23 of the outer case 20, and is discharged from the hollow fiber membrane module 1.

The bypass portion 14 is provided on the downstream side of the inner case 10, and the humid gas that is caused to flow out to the space S from the bypass portion 14 flows out to a region on the downstream side of the space S. Also, the discharge portion 23 is provided on the downstream side of the outer case 20, and the humid gas that has flowed out to the space S from the bypass portion 14 is likely to linearly flow in the radial direction in the region on the downstream side of the space S. Therefore, the humid gas flowing out to the space S from the bypass portion 14 has less contact with the hollow fiber membranes 31, receives less resistance from the contact with the hollow fiber membranes 31, and has a curbed pressure loss. Therefore, a dynamic pressure of the humid gas exiting the bypass portion 14 of the inner case 10 and passing through the third fluid path F3 is higher than a dynamic pressure of the humid gas exiting the introduction portion 13 of the inner case 10 and passing through the second fluid path F2 in the region on the downstream side of the space S.

In a case where the dynamic pressure of the humid gas exiting the introduction portion 13 of the inner case 10 and passing through the second fluid path F2 becomes lower on the downstream side due to the resistance received by the contact with the hollow fiber membranes 31, and the like, the humid gas passing through the second fluid path F2 stagnates on the downstream side of the space S. On the contrary, the hollow fiber membrane module 1 includes the bypass portion 14 on the downstream side of the inner case 10, the pressure loss of the gas flowing inside the space S from the bypass portion 14 to the discharge portion 23 is low, and it is possible to cause the gas, the decrease in dynamic pressure of which has been curbed, to flow through the third fluid path F3 on the downstream side of the space S. A flow of the humid gas in the second fluid path F2 is dragged by a flow of the humid gas in the third fluid path F3, and a decrease in dynamic pressure of the humid gas flowing through the second fluid path F2 on the downstream side is curbed. In this manner, prevention of the humid gas flowing through the second fluid path F2 from stagnating on the downstream side of the space S is achieved. In this manner, it is possible to cause the membrane separation action of the hollow fiber membranes 31 with respect to the humid gas in the second fluid path F2 on the downstream side of the space S to be improved and to cause humidification efficiency for the dry air to be improved.

Also, the humid gas supplied from the humid gas supply device 51 enters the inside of the inner case 10 from the opening 16 on the upstream side of the inner case 10 and flows to the discharge portion 23 from the third fluid path F3 as well rather than flowing to the discharge portion 23 only from the second fluid path F2. Therefore, it is possible to cause the pressure loss of the humid gas flowing through the space G between the mutually adjacent hollow fiber membranes 31 in the space S to decrease as compared with a case where excessively supplied humid gas flows into the space S only from the introduction portion 13. It is possible to curb the humid gas from stagnating on the downstream side of the second fluid path F2 and to cause humidification performance to be improved in this regard as well.

Also, in the inner case 10, the upstream main body portion 11 has a tapered shape, but the downstream main body portion 12 is continuous from the side of the small diameter of the upstream main body portion 11 and has a constant or substantially constant diameter. Therefore, it is easy to secure a space on the outer periphery side of the downstream main body portion 12 and to increase the part of the downstream main body portion 12 on the outer periphery side in size in the space S. In this manner, it is possible to curb a filling rate of the space S with the hollow fiber membranes 31 from increasing and to curb a pressure loss of a fluid in a region of the space S on the outer periphery side of the downstream main body portion 12. Therefore, it is possible to curb a pressure loss of the humid gas flowing through the second fluid path F2 and the humid gas flowing through the third fluid path F3 and to further achieve curbing of the humid gas flowing through the second fluid path F2 from stagnating on the downstream side of the space S.

In this manner, according to the hollow fiber membrane module 1 of the embodiment of the present disclosure, it is possible to curb a pressure loss of gas flowing inside the hollow fiber membrane module 1. It is thus possible to achieve an improvement in efficiency of humidifying dry air.

Although the hollow fiber membrane module 1 according to the embodiment of the present disclosure has been described hitherto, the hollow fiber membrane module according to the present disclosure is not limited to the hollow fiber membrane module 1 as described above and includes any aspects included in the concept of the present disclosure and the scope of the claims. Also, each configuration may be appropriately and selectively combined to achieve at least a part of the aforementioned object and advantages. For example, the shape, the material, the arrangement, the size, and the like of each component in the above embodiment can be appropriately changed in accordance with a specific utilization aspect of the present disclosure.

For example, the sealing portion 18 may not be provided at the inner case 10 of the hollow fiber membrane module 1. For example, the tight sealing of the opening 17 or curbing of the gas from flowing out from the opening 17 may be achieved by tapering the downstream end portion 12*b* of the inner case 10 and reducing the opening 17 in size. Also, the tight sealing of the opening 17 or the curbing of the gas from flowing out from the opening 17 may be achieved by causing the downstream end portion 12*b* of the inner case 10 to be deformed and thereby reducing the opening 17 in size or smashing the opening 17, for example. The present disclosure can exhibit the act and the advantages even in the hollow fiber membrane module 1 that is not provided with the sealing portion 18 in a case where the aforementioned problem has occurred, similarly to the aforementioned case of the hollow fiber membrane module 1 according to the embodiment of the present disclosure. Also, the sealing portion 18 formed of the same material as or a different material from that of the inner case 10 may be fixed to the end of the inner case 10 on the downstream side with an adhesive or through fitting, and the tight sealing of the opening 17 may thus be achieved. Moreover, a bottom portion may be formed integrally with the end of the inner case 10 on the downstream side with no sealing portion 18 attached to the inner case 10 and with no opening 17 formed in the inner case 10. In other words, the sealing portion 18 may be formed integrally with another part of the inner case 10 from a same material.

Also, although the gas is assumed to flow from the upstream side to the downstream side through the first fluid path F1 in the usage state of the hollow fiber membrane module 1, the gas may flow from the downstream side to the upstream side through the first fluid path F1.

Also, although the dry gas is assumed to flow through the first fluid path F1 and the humid gas is assumed to flow through the second and third fluid paths F2 and F3 in the usage state of the hollow fiber membrane module 1, the humid gas may flow through the first fluid path F1, and the dry gas may flow through the second and third fluid paths F2 and F3.

In addition, although the hollow fiber membrane module 1 is assumed to be applied to a humidification module of a humidification device for a fuel cell in the above description, an application target of the hollow fiber membrane module according to the present disclosure is not limited to the humidification module of the humidification device for a fuel cell and is not limited to the fuel cell. Moreover, the application target of the hollow fiber membrane module according to the present disclosure is not limited to the humidification module and may be a dehumidification module of a dehumidification device. The hollow fiber membrane module according to the present disclosure can be applied to any target that can utilize the act and the advantages.

In addition, although the dry gas is assumed to be the oxidant gas such as oxygen in the reaction gas, and the humid gas is assumed to be oxidant off gas in the off gas after the oxidant gas such as oxygen is used for power generation in the above description, the dry gas may be fuel gas such as hydrogen in the reaction gas, and the humid gas may be fuel off gas in the off gas after the fuel gas such as hydrogen is used for power generation.

Figure 6:
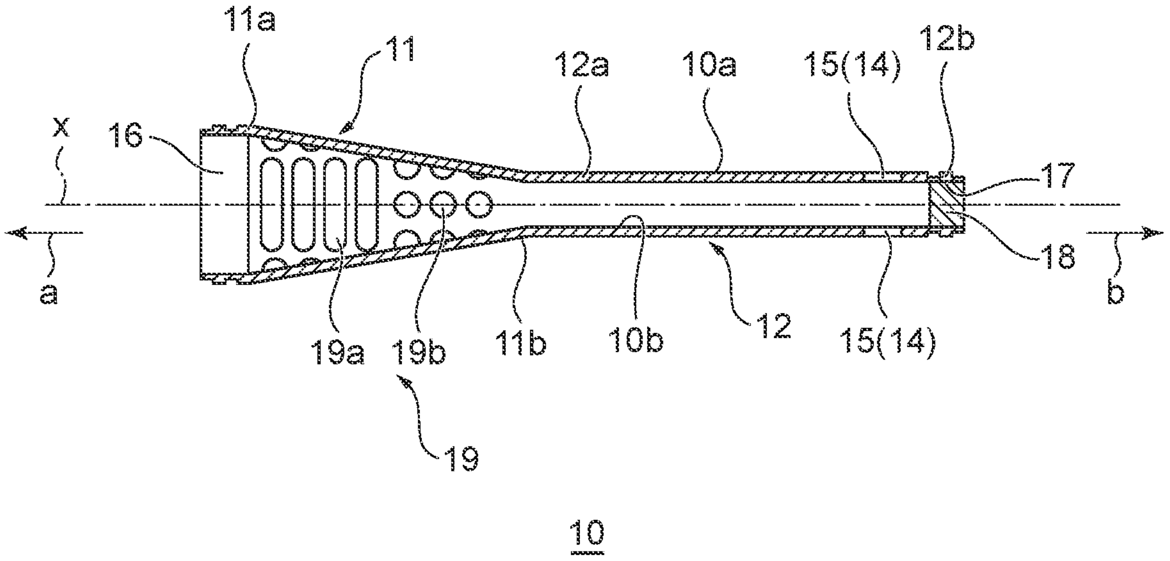
FIG. 6 A sectional view illustrating a modification of an introduction portion in the hollow fiber membrane module illustrated in FIG. 1.

Also, the aforementioned introduction portion 13 that establishes communication between the inside and the outside of the inner case 10 is not limited to the aforementioned form. For example, the inner case 10 may be one including an introduction portion 19 as illustrated in FIG. 6 instead of the introduction portion 13. Specifically, the introduction portion 19 includes at least one large introduction port 19*a* that is an opening (through-hole) penetrating through the inner case 10 between the inside and the outside and includes at least one small introduction port 19*b* that is an opening (through-hole) penetrating through the inner case 10 between the inside and the outside as illustrated in FIG. 6. An opening area of the large introduction port 19*a* is larger than an opening area of the small introduction port 19*b*. An opening area of each of the large introduction port 19*a* and the small introduction port 19*b* indicates a size of a plane in a space that each of the large introduction port 19*a* and the small introduction port 19*b* forms in the inner case 10 and is an area of a plane extending along the outer peripheral surface 10*a* or the inner peripheral surface 10*b* of the inner case 10 in each of regions of the large introduction port 19*a* and the small introduction port 19*b*, for example. The large introduction port 19*a* is provided on any side out of the upstream side and the downstream side with respect to the small introduction port 19*b*.

Specifically, the introduction portion 19 includes a plurality of large introduction ports 19*a* aligned at equal angular intervals or substantially equal angular intervals in the circumferential direction at a same position or substantially a same position in the axis x direction as illustrated in FIG.

6. Each large introduction port 19*a* extends along an arc and includes a part extending in the circumferential direction with a constant or substantially constant width in the axis x direction and parts forming end portions of curved surfaces at both ends thereof as illustrated in FIG. 6, for example. The large introduction ports 19*a* may have another shape. Also, the introduction portion 19 includes a plurality of large introduction port 19*a* groups constituted by the plurality of large introduction ports 19*a* being aligned in the circumferential direction. For example, as illustrated in FIG. 6, in the inner case 10, three large introduction port 19*a* groups are aligned at equal intervals or substantially equal intervals in the axis x direction.

Specifically, the introduction portion 19 includes a plurality of small introduction ports 19*b* aligned at equal angular intervals or substantially equal angular intervals in the circumferential direction at a same position or substantially a same position in the axis x direction as illustrated in FIG. 6. Each small introduction port 19*b* has an oval shape, substantially an oval shape, or a circular shape expanding in the circumferential direction as a shape when seen in the radial direction. The small introduction port 19*b*, similarly to the large introduction port 19*a*, may extend along an arc and may include a part extending in the circumferential direction with a constant or substantially constant width in the axis x direction and parts forming end portions of curved surfaces at both ends thereof. The small introduction port 19*b* may have another shape. Also, the introduction portion 19 includes a plurality of small introduction port 19*b* groups constituted by the plurality of small introduction ports 19*b* being aligned in the circumferential direction in this manner. For example, as illustrated in FIG. 6, in the inner case 10, three small introduction port 19*b* groups are aligned at equal intervals or substantially equal intervals in the axis x direction.

Also, the small introduction ports 19*b* are formed at a part on a side further downstream in the axis x direction than a part of the inner case 10 where the large introduction ports 19*a* are formed in the inner case 10 as illustrated in FIG. 6. The small introduction ports 19*b* may be formed at a part on a side further upstream in the axis x direction than the part of the inner case 10 where the large introduction ports 19*a* are formed in the inner case 10. Also, the part where the small introduction ports 19*b* are formed and the part where the large introduction ports 19*a* are formed may not be divided in the axis x direction in the inner case 10, and the large introduction ports 19*a* and the small introduction ports 19*b* may be present in a mixed manner in the introduction portion 19.

Note that the form of the introduction portion 19 is not limited to the aforementioned form. For example, the introduction portion 19 may be one formed of the large introduction port 19*a* group and the small introduction port 19*b* group each aligned in one array or of the large introduction port 19*a* groups and the small introduction port 19*b* groups each aligned in one array or a plurality of arrays. Also, each large introduction port 19*a* group and each small introduction port 19*b* group may not be introduction port groups configured of the plurality of large introduction ports 19*a* and small introduction ports 19*b*, respectively and may be configured of one large introduction port 19*a* and one small introduction port 19*b*. Moreover, one of each large introduction port 19*a* group and each small introduction port 19*b* group may be configured of one large introduction port 19*a* or one small introduction port 19*b*, and another one of each large introduction port 19*a* group and each small introduction port 19*b* group may be configured of a plurality of large introduction ports 19*a* or a plurality of small introduction ports 19*b*. The form of the introduction portion 19 can be various forms in accordance with utilization aspects of the hollow fiber membrane module 10.

In a case where the upstream main body portion 11 of the inner case 10 has a diameter reduced as progress from the upstream side toward the downstream side and the large introduction ports 19*a* and the small introduction ports 19*b* are formed in the upstream main body portion 11, gas flowing out to the space S from the large introduction ports 19*a* and the small introduction ports 19*b* have a trend that the gas flows out in a direction inclined with respect to the axis x. In this manner, the humid gas that has flowed out to the space S from the large introduction ports 19*a* and the small introduction ports 19*b* is likely to flow in the direction inclined with respect to the axis x through the space G between the mutually adjacent hollow fiber membranes 31 in the space S, and the humid gas is likely to flow against the dry gas passing through the inside of the hollow fiber membranes 31.

Also, in the introduction portion 19, the opening area of the large introduction ports 19*a* provided on the upstream side is larger than the opening area of the small introduction ports 19*b* provided on the downstream side. Therefore, it is possible to set a larger flow amount of air flowing out to the space S from the large introduction ports 19*a* on the upstream side with the large opening area than a flow amount of gas flowing out to the space S from the small introduction ports 19*b* on the downstream side with the smaller opening area. In this manner, it is possible to adjust the flow amount of gas flowing out to the space S in accordance with the positions in the introduction portion 19 and thereby to adjust the flow amount of gas flowing through the space G between the mutually adjacent hollow fiber membranes 31 in accordance with the position in the space S. According to the hollow fiber membrane module 1, the flow amount of gas flowing out to the space S from the part of the introduction portion 19 on the upstream side is large as described above, and it is possible to cause the gas to flow into a further outer periphery side in the space S and to achieve an increase in flow amount of gas flowing through the space G on the outer periphery side in the space S. On the other hand, the flow amount of gas flowing out to the space S from the part of the introduction portion 19 on the downstream side is smaller than the flow amount of gas flowing out to the space S from the part on the upstream side as described above, and it is possible to achieve a balance between the flow amount of gas flowing through the space G on the inner periphery side in the space S and the flow amount of gas reaching the space G on the further outer periphery side in the space S and flowing therethrough. Additionally, it is possible to allow the gas flowing out to the space S from the introduction portion 19 to have a trend that the gas flows out in the direction inclined with respect to the axis x from the difference in flow amounts of gas flowing out from the introduction portion 19 on the upstream side and the downstream side as well.

The invention claimed is:

1. A hollow fiber membrane module comprising:

an inner case that is a member with a tubular shape;

an outer case that is a member with a tubular shape covering the inner case from an outer periphery side with a space left therebetween; and a plurality of hollow fiber membranes that are provided in the space between the inner case and the outer case, wherein the inner case includes an introduction portion that is a part establishing communication between inside of the inner case and outside of the inner case on a side of one end in an extending direction of the inner case and the outer case, the outer case includes a discharge portion that is a part establishing communication between inside of the outer case and outside of the outer case on a side of another end in the extending direction, the inner case includes a bypass portion that is a part establishing communication between the inside of the inner case and the outside of the inner case on the side of the another end in the extending direction, the bypass portion includes at least one opening that penetrates through the inner case between the inside and the outside, and wherein the inner case includes one end portion with a tubular shape that is a part on the side of the one end and another end portion with a tubular shape that is a part on the side of the another end and connects to the one end portion on the side of the another end, the introduction portion is provided at the one end portion, the bypass portion is provided at the another end portion, the one end portion has a diameter reduced as progress from the side of the one end toward the side of the another end in the extending direction, and the another end portion extends along the extending direction.

2. The hollow fiber membrane module according to claim 1, wherein the bypass portion and the discharge portion at least partially face each other in a direction perpendicularly intersecting the extending direction.

3. The hollow fiber membrane module according to claim 1, further comprising: an inner case sealing portion that is a member tightly closing an opening of the inner case that opens the inside of the inner case on the side of the another end.

4. The hollow fiber membrane module according to claim 1, wherein the introduction portion includes a plurality of openings that penetrate through the inner case between the inside and the outside.

5. The hollow fiber membrane module according to claim 1, further comprising:

a one-end-side sealing portion that tightly closes an open portion that is opened on the side of the one end of the space between the inner case and the outer case; and an other-end-side sealing portion that tightly closes an open portion that is opened on the side of the another end of the space between the inner case and the outer case, wherein the plurality of hollow fiber membranes extend along the extending direction and penetrate through the one-end-side sealing portion and the other-end-side sealing portion.

* * * * *